United States Patent
Wolff et al.

(10) Patent No.: US 11,772,618 B2
(45) Date of Patent: Oct. 3, 2023

(54) METHOD AND DEVICE FOR OPERATING A PARKING BRAKE SYSTEM

(71) Applicant: Robert Bosch GmbH, Stuttgart (DE)

(72) Inventors: Helmut Wolff, Untergruppenbach (DE); Frank Baehrle-Miller, Schoenaich (DE); Hubertus Wienken, Langenbrettach (DE)

(73) Assignee: Robert Bosch GmbH, Stuttgart (DE)

( * ) Notice: Subject to any disclaimer, the term of this patent is extended or adjusted under 35 U.S.C. 154(b) by 568 days.

(21) Appl. No.: 16/831,137

(22) Filed: Mar. 26, 2020

(65) Prior Publication Data
US 2020/0353907 A1 Nov. 12, 2020

(30) Foreign Application Priority Data

May 6, 2019 (DE) ..................... 10 2019 206 487.6

(51) Int. Cl.
*B60T 8/26* (2006.01)
*B60T 8/171* (2006.01)
*B60T 8/32* (2006.01)

(52) U.S. Cl.
CPC .............. *B60T 8/26* (2013.01); *B60T 8/171* (2013.01); *B60T 8/32* (2013.01); *B60T 2201/10* (2013.01); *B60T 2201/14* (2013.01)

(58) Field of Classification Search
None
See application file for complete search history.

(56) References Cited

U.S. PATENT DOCUMENTS

| 3,439,786 | A | * | 4/1969 | Schmid | B60T 1/062 |
| | | | | | 192/221 |
| 2009/0195058 | A1 | * | 8/2009 | Jackson | B60T 13/683 |
| | | | | | 303/20 |
| 2011/0230294 | A1 | * | 9/2011 | Yang | B60T 7/122 |
| | | | | | 475/150 |
| 2019/0072180 | A1 | * | 3/2019 | Kim | F16H 63/483 |
| 2019/0106093 | A1 | * | 4/2019 | Lemaitre | B60T 8/171 |

FOREIGN PATENT DOCUMENTS

| DE | 10 2011 004 772 A1 | | 8/2012 | | |
| DE | 102016220271 A1 | * | 4/2018 | | |
| DE | 102017110942 A1 | * | 11/2018 | ........... | B60K 17/043 |
| JP | 05278483 A | * | 10/1993 | | |
| WO | WO-2019002916 A1 | * | 1/2019 | ............ | B60T 13/746 |

* cited by examiner

*Primary Examiner* — Melanie Torres Williams
(74) *Attorney, Agent, or Firm* — Maginot, Moore & Beck LLP

(57) ABSTRACT

A method for operating a parking brake system includes establishing a parking brake request for a first automated parking brake constructed on a first wheel located on a first side of an axle of a motor vehicle, producing a braking force at the first wheel by activating, in response to the establishing of the parking brake request, the first automated parking brake, and activating a compensation device connecting the first wheel and a second wheel located on a second side of the axle to apply a braking force to the second wheel via the first wheel.

10 Claims, 3 Drawing Sheets

METHOD AND DEVICE FOR OPERATING A PARKING BRAKE SYSTEM

This application claims priority under 35 U.S.C. § 119 to application no. DE 10 2019 206 487.6 filed on May 6, 2019 in Germany, the disclosure of which is incorporated herein by reference in its entirety.

The present disclosure relates to a parking brake system and a method for operating a parking brake system for a motor vehicle.

BACKGROUND

From the prior art, automated parking brakes (also referred to as electric parking brakes or automatic parking brakes, APB) are known. They ensure that a vehicle is securely stopped. In addition to ensuring secure stopping, parking brakes enable emergency stopping in situations in which the main brake system is no longer capable of producing a deceleration as a result, for example, of an error. The parking brake actuators which are commercially available for producing and dissipating the required clamping force are available in a great variety of structural embodiments. Previous parking brake systems are based on using electromechanical parking brake actuators at both vehicle sides of the rear axle in order, on the one hand, to produce uniformity of the braking action and, on the other hand, to produce sufficient securing action. Such a parking brake is, for example, described in the patent application DE 10 2011 004 772 A1.

Electronically controlled locking differentials are further known from the prior art. In this case, they support the redirection of drive torques in a metered manner to the wheels which have more traction.

Via independent control devices, axle or center differentials can accordingly be controlled in such a manner that drive torques can be redirected between the drive wheels of the respective axle or axle set. Such electronically controlled locking differentials are already widely available in current vehicles.

SUMMARY

Advantageously, the method according to the disclosure or the device according to the disclosure enables a solution in order to increase safety and/or to reduce costs. This is enabled according to the disclosure by the features of the disclosure.

The method according to the disclosure for operating a parking brake system for a motor vehicle, wherein the motor vehicle has at least one vehicle axle having a first wheel at one side and a second wheel at the opposite side of the vehicle axle, wherein both wheels are connected to each other by means of an activatable compensation device and an automated parking brake is constructed only on the first wheel, comprises the steps of:

activating the automated parking brake in the event of a parking brake request being established in order to produce a braking force at the first wheel activating the compensation device between both wheels in order to apply a braking force to the second wheel via the first wheel.

This is intended to be understood to mean that a braking action on the wheel on which the singular parking brake is constructed is produced by the direct introduction of the braking force by means of the parking brake into this first wheel. The production of a braking action on the opposing second wheel (without parking brake) is carried out by redirecting a portion of the brake torque produced by the parking brake at the first wheel. With this understanding, it is also possible to refer to an indirect introduction of a braking force into the second wheel, as a result of a transmission of at least a portion of the braking action produced between the parking brake and the first wheel via the compensation device to the second wheel.

The braking action produced results from a brake torque which is applied and/or a braking force which is applied to the wheel brake and leads to a deceleration of the motor vehicle. Accordingly, the terms are intended to be used in a similar manner. Furthermore, the first wheel is, for example, the left wheel in the travel direction, alternatively the right wheel in the travel direction. The second wheel is accordingly similar, for example, the right wheel in the travel direction, alternatively the left wheel in the travel direction.

An activatable compensation device may be understood to be any type of electrically activatable, controllable and/or adjustable torque transmission device, for example, an electronically controlled locking differential.

The method set out herein combines in this context the operational principles of an individual parking brake actuator with those of the electronic locking differential. A redirection of torque is possible via the differential, that is to say, not only with a driving action but also in the event of decelerations. That is to say, when the parking brake system is used, the parking brake actuator which is installed at one side builds up braking force, but via the control of the locking differential an adjustable redirection of this brake torque onto the second wheel of the axle can be carried out. Consequently, the uniformity of the braking action can be complied with using only one parking brake actuator. Furthermore, since this is an application which is based on the same principle but supported differently, this type of combined control can also be used for emergency decelerations in order to decelerate the vehicle in a directionally stable manner. A sub-variant may also be used for conventional APB systems with 2 actuators, as soon as an actuator has an error and a uniformity of the braking action using the locking differential is intended to be achieved.

In an advantageous embodiment of the method, the activation of the compensation device is carried out when a parking brake request is established, wherein in particular the activation of the compensation device is carried out prior to an activation of the parking brake, or alternatively the activation of the compensation device is carried out at the same time as or directly after the activation of the parking brake.

This is intended to be understood to mean that the activation of the compensation device is carried out in accordance with the established parking brake request. A parking brake request may, for example, be carried out by the driver by actuating the parking brake switch in the "close" direction. Alternatively, a parking brake request can also be carried out in an automated manner, for example, in an emergency braking situation. The activation of the compensation device after a recognized parking brake request can be carried out before, at the same time as or directly after the activation of the parking brake. The method may further involve the method step "establishing a parking brake request".

In one possible embodiment of the method, the compensation device is activated when a wheel rotation is determined in at least one of the two wheels.

This is intended to be understood to mean that, when a parking brake is activated on only one wheel of a vehicle axle, an activation of the compensation device in order to transmit brake torque to the other wheel of the vehicle axle is carried out only when a rotation of at least one wheel is determined. For example, when the vehicle is parked on level ground, the activation of the parking brake at only one wheel may already be sufficient to achieve the required parking braking action. Accordingly, the parking brake is initially activated only at one wheel. If a movement of the vehicle subsequently occurs, by activating the compensation device a braking force is applied to the second wheel. If a parking brake request is already carried out in the event of a movement of the vehicle, the compensation device is accordingly immediately activated and a braking force is immediately applied to the second wheel by means of the activated compensation device. The method may involve the method step "establishing a wheel rotation".

In a preferred embodiment of the method, the activation of the compensation device is carried out in such a manner that a defined braking force is adjusted on the second wheel.

This is intended to be understood to mean that the compensation device is controlled or adjusted in such a manner that a specific braking action is achieved at the second wheel. The compensation device may, as already set out, be constructed, for example, as an electronically controlled locking differential. Accordingly, the transmission of brake torque and braking force to the second wheel can be adjusted. The magnitude of the braking force applied to the second wheel subsequently defines the braking action at the second wheel. The definition of the braking force which is intended to be adjusted at the second wheel may, for example, be carried out in accordance with the braking action at the first wheel. For example, a proportional distribution of the force of the parking brake may be carried out. The corresponding proportion may be carried out in accordance with the movement behavior of the motor vehicle and/or the respective travel situation and may, for example, take into account different friction values (µ-split) at the wheels. The distribution of the braking forces at the first wheel and second wheel may accordingly be uniform or also non-uniform.

In an alternative development of the method, the activation of the compensation device is carried out in such a manner that a uniformity of the braking action of the motor vehicle is adjusted.

This is intended to be understood to mean that, as a result of a control of the compensation device, a uniform distribution of the braking action at the left and right vehicle side is adjusted. That is to say, the braking force on the first wheel and the transmitted braking force on the second wheel are adjusted in such a manner relative to each other that a uniform braking action is produced on the vehicle. A deviation from the travel lane during movement of the vehicle is thereby prevented. It is further made possible for the difference of the braking forces in the upper region directly in front of the blocking limit to be no more than 30% with respect to the higher measurement value in each case. In addition to the lane-keeping and the self-steering movement, therefore, the blocking behavior is also thereby improved.

In an advantageous embodiment, wheel speed information is taken into account in order to adjust the uniform braking action.

This is intended to be understood to mean that, for example, the wheel speeds of the wheels are established and evaluated. In addition to the pure speeds of the wheels, consideration of a "transverse influence" by the steering lock can be carried out. That is to say, on a bend, the outer wheel will always move more rapidly than the wheel on the inner side of the bend. Where applicable, this can be taken into account as a threshold value. It is thus possible, for example, by comparing the wheel speeds of the left wheel and right wheel to establish a deviation in the lane-keeping of the vehicle. A correction of the deviation is carried out accordingly via the adjustment of the torque transmission by means of the compensation device and/or by means of adjustment of the braking force by the parking brake. Alternatively, angular speeds of the wheels can be established and evaluated. The method may involve the method step "establishing and evaluating the wheel speeds".

In one possible embodiment of the method, the wheel speeds of a first and a second wheel of a vehicle axle are analyzed, in particular the first and second wheels of the vehicle axle which has the parking brake and the compensation device.

In a preferred development of the method, the wheel speeds of the wheels of a first vehicle axle are analyzed with the wheel speeds of the wheels of a second vehicle axle.

In an alternative embodiment of the method, an automated parking brake is constructed on the first wheel and on the second wheel of the vehicle axle, wherein the method is used when an error is established in one of the parking brakes.

This is intended to be understood to mean that the method is used when an error in a parking brake system has been established. The method is used particularly when one of the two parking brakes is not functional. The method consequently enables the parking function to be maintained, even in the event of a partial failure of a regular parking brake system, and a uniform emergency brake deceleration using only one functional parking brake actuator.

This method may, for example, be implemented in software or hardware or in a mixed form of software and hardware, for example, in a control device. The approach set out here further provides a device which is constructed to carry out, control or implement the steps of a variant of a method set out herein in corresponding devices. Using this construction variant of the disclosure in the form of a device, the object forming the basis of the disclosure can also be achieved in a rapid and efficient manner.

According to the disclosure, a parking brake system for a motor vehicle is further provided, wherein the motor vehicle has at least one vehicle axle having a first wheel at one side and a second wheel at the opposite side of the vehicle axle, wherein both wheels are connected to each other by means of an activatable compensation device and an automated parking brake is constructed only on the first wheel.

This is intended to be understood to mean that in the parking brake system an automated parking brake is constructed only on the first wheel of the vehicle axle. That is to say, a parking brake device is provided either on the left wheel or on the right wheel. Advantageously, costs and structural space can thereby be saved. Both wheels are further connected to an activatable compensation device so that the parking brake function and the emergency deceleration with uniform braking action is enabled on both vehicle sides.

In an alternative embodiment, the vehicle has a plurality of vehicle axles, of which at least two vehicle axles each have a parking brake. For example, with two vehicle axles, the positioning of the parking brakes could be carried out at opposing sides, for example, on the left wheel of the front axle and on the right wheel of the rear axle.

In an advantageous embodiment of the parking brake system, an automated parking brake is constructed only on one wheel of the motor vehicle.

This is intended to be understood to mean that only one parking brake is provided on only one wheel of the motor vehicle. Advantageously, costs and structural space can thereby be saved. This wheel is connected to the opposing wheel of the vehicle axle via an activatable compensation device. Advantageously, the vehicle axle which has the parking brake and the compensation device is a drive axle of the motor vehicle.

In one possible embodiment of the parking brake system, the activatable compensation device is constructed as a locking differential, in particular constructed as an electronically controlled locking differential.

This is intended to be understood to mean that the compensation device for transmitting torque is a controllable or adjustable locking device. Based on this understanding, it could be referred to as a torque control device. Advantageously, the device has an adjustable locking action. The locking action is, for example, quantified with the variables Torque Bias Ratio (TBR) and locking value. Possible embodiments are, for example, Torsen differentials or clutch-based locking differentials or electronic locks or torque vectoring devices.

BRIEF DESCRIPTION OF THE DRAWINGS

It should be noted that the features set out individually in the description can be combined with each other in any technically advantageous manner and set out additional embodiments of the disclosure. Other features and advantages of the disclosure will be appreciated from the description of embodiments with reference to the appended drawings.

In the drawings.

DETAILED DESCRIPTION

Figure 1:
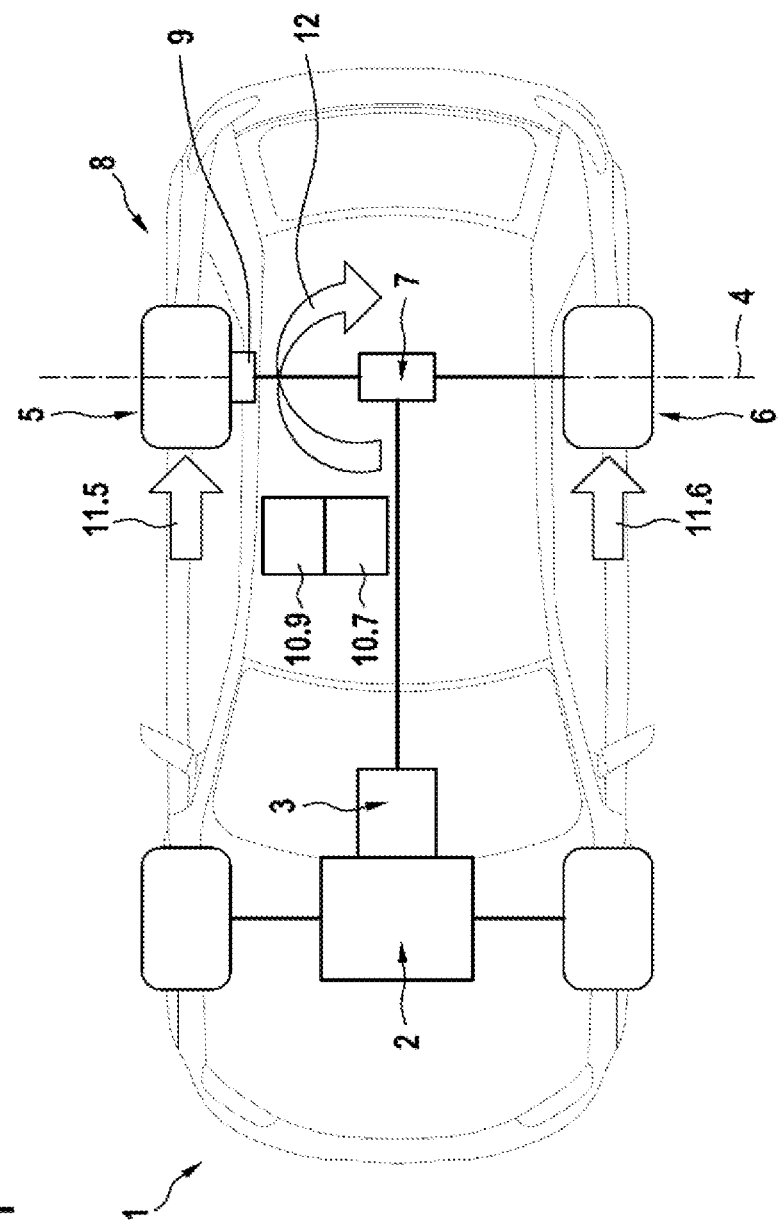
FIG. 1 is a schematic illustration of an embodiment of the disclosure.

FIG. 1 is a schematic illustration of an embodiment of the disclosure. In this instance, FIG. 1 shows a parking brake system 8 for a motor vehicle 1, wherein the motor vehicle 1 has at least one vehicle axle 4 having a first wheel 5 at one side and a second wheel 6 at the opposing side of the vehicle axle 4, wherein both wheels 5, 6 are connected to each other by means of an activatable compensation device 7 and an automated parking brake 9 is constructed only at the first wheel 5. Furthermore, the drive motor 2 is shown and may be constructed as an internal combustion engine or as an electric motor. The drive motor 2 acts via a gear mechanism 3 on the vehicle axle 4. When the parking brake 9 is activated, a braking force 11.5 is produced at the first wheel 5. When the compensation device 7 is activated, there is produced a controlled torque transmission 12 to the second wheel 6, whereby a braking force 11.6 is also produced on this wheel 6. The activation of the compensation device 7 is carried out via a control device 10.7. The activation of the parking brake 9 is carried out via a control device 10.9. For example, both control devices 10.7 and 10.9 may be structurally combined in one component or be structurally separate.

Figure 2:
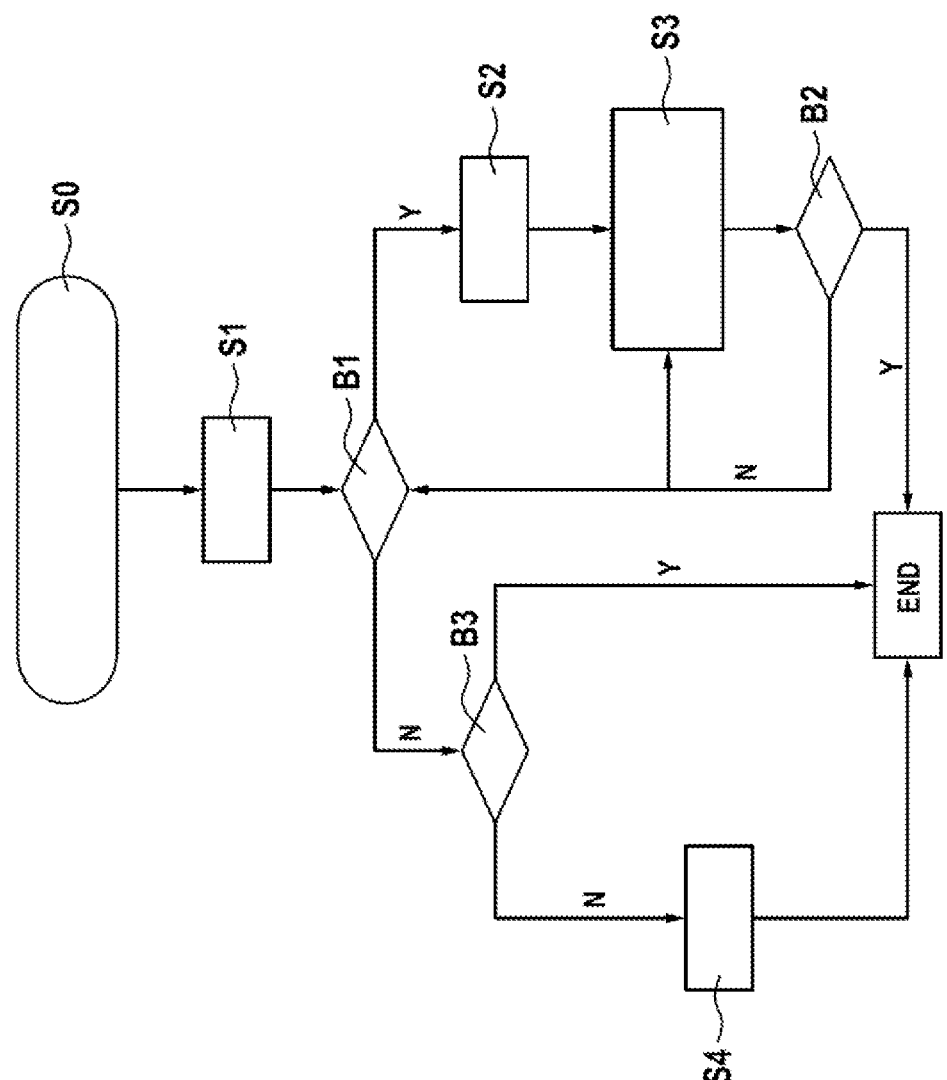
FIG. 2 is an illustration of the method steps of a possible embodiment of the disclosure.

FIG. 2 is an illustration of the method steps of an embodiment of the disclosure. The method is shown in this instance for operating a parking brake system with a compensation device between two wheels of an axle and a parking brake at only one of the two wheels. In this instance, in a first step S0, the method is started. In the next step S1, a parking brake request is established. A parking brake request may, for example, be initiated by a driver request by the driver activating the parking brake switch. Alternatively, for example, in an emergency situation, a parking brake request can also be initiated automatically. An emergency situation arises, for example, when an error is established in the service brake system during driving and a braking operation is intended to be carried out. The establishment of an emergency braking situation can be carried out, for example, by evaluating video data and/or radar data. Subsequently, using the condition B1, it is verified whether all conditions for carrying out a parking brake operation are (still) met. If the condition is met (Y path), in the next method step S2 the electronically controlled locking differential is activated. This is intended to be understood to mean that the locking differential is closed. In the next method step S3, the parking brake is activated. This is intended to be understood to mean that the parking brake actuator is activated in the "Close" direction. Where applicable in this instance, a controlled or adjusted operation of the parking brake can also be carried out by means of the control device, with "closure phases" and "release phases". With the condition B2, it is verified whether the target clamping force or the desired deceleration is achieved. If the condition B2 is complied with (Y path), the method is terminated with the step END. If the condition B2 is not met (N path), the parking brake actuator continues to be activated as described in the method step S3. It is further conceivable that—if the condition B2 is not complied with—the condition B1 is verified again and only in the event of a continued closure request (Y path of B1) are the steps S2 and S3 further carried out. If the condition B1 is not complied with (N path), in another condition B3 it is verified whether the parking brake actuator is released. If the condition B3 is met (Y path), the method is terminated with the step END. If the condition B3 is not met (N path), in a method step S4 the parking brake actuator is released before the method is terminated with the step END.

Figure 3:
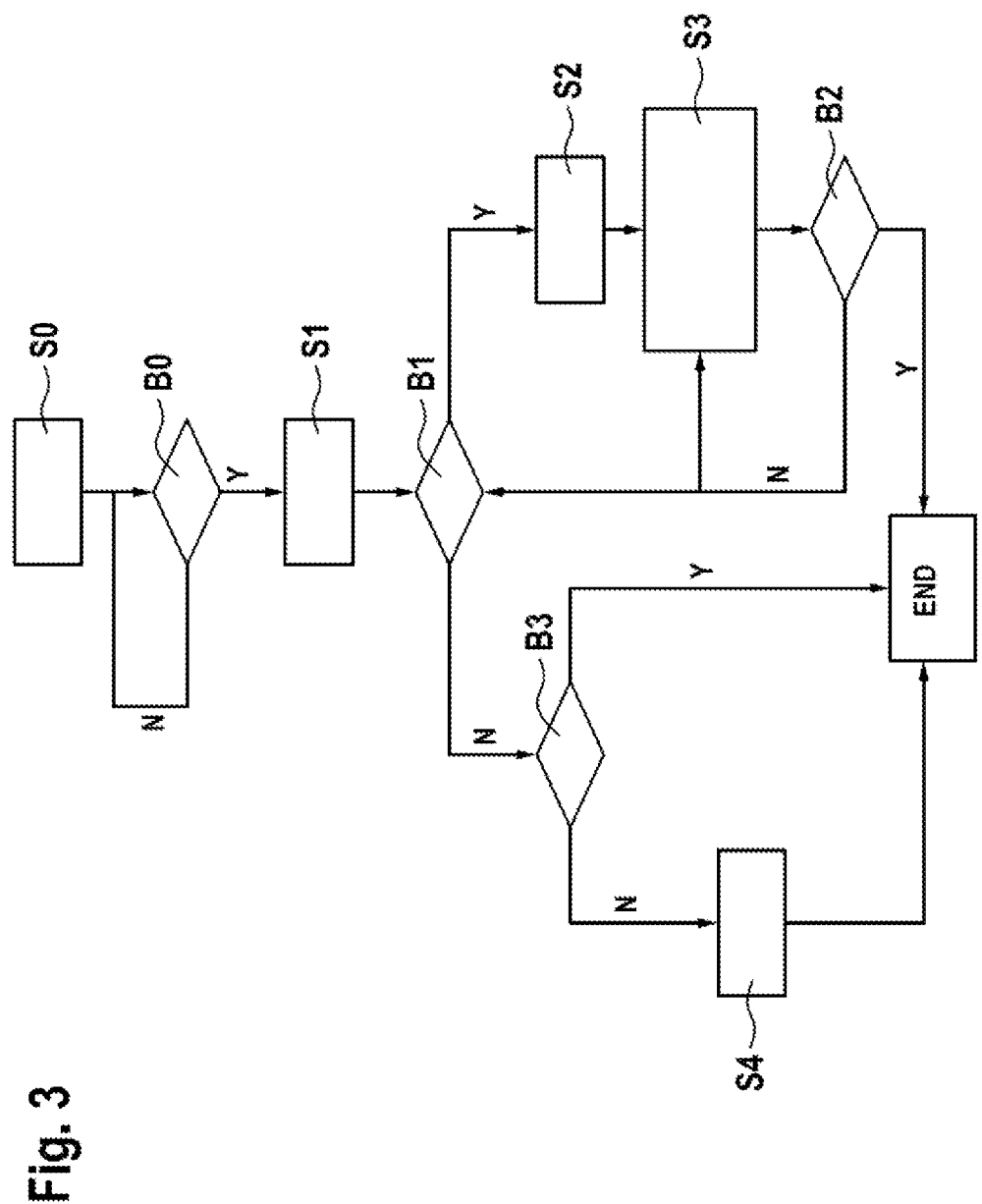
FIG. 3 is an illustration of the method steps of an alternative embodiment of the disclosure.

FIG. 3 is an illustration of the method steps of an alternative embodiment of the disclosure. The method steps substantially correspond to the method steps described in relation to FIG. 2. In contrast to this, the method is provided for operating a parking brake system with a compensation device between two wheels of an axle and with parking brakes on both wheels. In this embodiment, an additional condition B0 is accordingly provided, in which it is verified whether there is an error with one of the two parking brakes. The method described is accordingly carried out only when there is an error with one of the two parking brakes. The condition B0 is accordingly illustrated before the method step S1. Alternatively, there may also be provision for this to be requested only at a later time, for example, directly before method step S2.

What is claimed is:

1. A motor vehicle system for operating a parking brake system, comprising:
   a motor vehicle including at least one vehicle axle;
   a first wheel at a first side of the vehicle axle;
   a second wheel at an opposite second side of the vehicle axle;
   an activatable compensation device operably connected to the first wheel and the second wheel;
   a first automated parking brake constructed on the first wheel; and a control device operably connected to the activatable compensation device, the control device configured to activate the activatable compensation device to apply a braking force to the second wheel via the first wheel in response to a braking force being produced at the first wheel by the first automated parking brake in response to a parking brake request, wherein there is no automated parking brake constructed on the second wheel, and wherein the control device is configured to activate the compensation device when the parking brake request is established, such that the activation of the compensation device is carried out prior to activation of the first automated parking brake.

2. The motor vehicle system according to claim 1, wherein the control device is further configured to activate the compensation device when a wheel rotation of at least one of the first wheel and the second wheel is determined.

3. The motor vehicle system method according to claim 1, wherein the control device is configured to apply a variable braking force to the second wheel by the activation of the compensation device.

4. The motor vehicle system according to claim 1, wherein applying the braking force results in a braking action, and the control device is further configured to adjust a uniformity of the braking action while applying the braking force to the second wheel.

5. The motor vehicle system according to claim 3, wherein the control device is further configured to adjust the uniformity of the braking action based upon wheel speed information.

6. The motor vehicle system according to claim 5, wherein the control device is further configured to analyze a wheel speed of the first wheel and to analyze a wheel speed of the second wheel to generate the wheel speed information.

7. The motor vehicle system according to claim 6, wherein the control device is further configured to analyze wheel speeds of wheels of a second vehicle axle to generate the wheel speed information.

8. A parking brake system, comprising:

a motor vehicle;

at least one vehicle axle having a first wheel at one side and a second wheel at an opposite side of the at least one vehicle axle;

an activatable compensation device connecting the first wheel and the second wheel; and an automated parking brake constructed on the first wheel, wherein there is no automated parking brake constructed on the second wheel.

9. The parking brake system according to claim 8, wherein the automated parking brake is the only automated parking brake of the motor vehicle.

10. The parking brake system according to claim 8, wherein the activatable compensation device is constructed as an electronically controlled locking differential.

\* \* \* \* \*

UNITED STATES PATENT AND TRADEMARK OFFICE
CERTIFICATE OF CORRECTION

PATENT NO. : 11,772,618 B2
APPLICATION NO. : 16/831137
DATED : October 3, 2023
INVENTOR(S) : Wolff et al.

It is certified that error appears in the above-identified patent and that said Letters Patent is hereby corrected as shown below:

In the Claims

In Claim 3, at Column 7, Line 18: "The motor vehicle system method according to claim 1," should read --The motor vehicle system according to claim 1--.

In Claim 5, at Column 7, Line 27: "claim 3" should read --claim 4--.

Signed and Sealed this
Twenty-third Day of January, 2024

Katherine Kelly Vidal
*Director of the United States Patent and Trademark Office*